US011515955B2

(12) United States Patent
Okada et al.

(10) Patent No.: US 11,515,955 B2
(45) Date of Patent: Nov. 29, 2022

(54) DEMODULATION CIRCUIT, PROCESSING CIRCUIT, PROCESSING METHOD, AND PROCESSING DEVICE

(71) Applicant: SONY SEMICONDUCTOR SOLUTIONS CORPORATION, Kanagawa (JP)

(72) Inventors: Satoshi Okada, Tokyo (JP); Kenichi Kobayashi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/964,194

(22) PCT Filed: Dec. 21, 2018

(86) PCT No.: PCT/JP2018/047235
§ 371 (c)(1),
(2) Date: Jul. 22, 2020

(87) PCT Pub. No.: WO2019/150841
PCT Pub. Date: Aug. 8, 2019

(65) Prior Publication Data
US 2021/0036793 A1 Feb. 4, 2021

(30) Foreign Application Priority Data

Feb. 5, 2018 (JP) .............................. JP2018-018148

(51) Int. Cl.
*H04H 40/18* (2008.01)
*H04B 1/16* (2006.01)
(52) U.S. Cl.
CPC ............... *H04H 40/18* (2013.01); *H04B 1/16* (2013.01)

(58) Field of Classification Search
CPC .................................. H04H 40/18; H04B 1/16
See application file for complete search history.

(56) References Cited

U.S. PATENT DOCUMENTS 5,821,874 A * 10/1998 Parvulescu ......... H04W 84/025
455/418
6,282,713 B1 * 8/2001 Kitsukawa ......... H04N 21/4784
725/36

(Continued)

FOREIGN PATENT DOCUMENTS

| CA | 2926766 A1 * | 4/2015 | ........... G06F 21/554 |
| CN | 105340202 A | 2/2016 | |

(Continued)

OTHER PUBLICATIONS

K. Park, Y. Lim and D. Y. Suh, "Delivery of ATSC 3.0 Services With MPEG Media Transport Standard Considering Redistribution in MPEG-2 TS Format," in IEEE Transactions on Broadcasting, vol. 62, No. 1, pp. 338-351, Mar. 2016, doi: 10.1109/TBC.2016. 2518625. (Year: 2016).*

(Continued)

*Primary Examiner* — Berhanu Tadese
(74) *Attorney, Agent, or Firm* — Chip Law Group

(57) ABSTRACT

To provide a demodulation circuit, a processing circuit, a processing method, and a processing device that are capable of implementing more prompt acquisition of alert information. Provided is a demodulation circuit including a demodulation unit configured to demodulate a broadcast signal received by a reception circuit that receives the broadcast signal, a determination unit configured to determine whether or not acquisition of alert information included in the demodulated broadcast signal is necessary according to a set operation mode, on the basis of first alert notification information indicating an update state of the alert information included in the demodulated broadcast signal, and an output (Continued)

processing unit configured to output second alert notification information corresponding to the operation mode from a predetermined terminal to which a processing circuit having a function to acquire the alert information is electrically connected, in a case where acquisition of the alert information is determined to be necessary.

17 Claims, 4 Drawing Sheets

(56) References Cited

U.S. PATENT DOCUMENTS

| | | | | |
|---|---|---|---|---|
| 6,956,812 | B2* | 10/2005 | Okada | H04L 27/2666 370/208 |
| 7,284,256 | B2* | 10/2007 | Candelore | H04H 60/65 348/E7.061 |
| 7,493,636 | B2* | 2/2009 | Kitsukawa | G06Q 20/387 725/23 |
| 7,725,911 | B2* | 5/2010 | Candelore | H04N 21/44222 725/142 |
| 10,051,227 | B1* | 8/2018 | Shintani | H04N 5/46 |
| 10,205,556 | B2* | 2/2019 | Kwak | H04L 65/611 |
| 10,264,328 | B2* | 4/2019 | Kitazato | H04N 21/6125 |
| 10,305,941 | B2* | 5/2019 | Lee | H04N 21/4383 |
| 10,382,241 | B2* | 8/2019 | Atungsiri | H04L 27/26526 |
| 10,389,460 | B2* | 8/2019 | Lee | H04H 20/423 |
| 10,469,220 | B2* | 11/2019 | Atungsiri | H04L 27/265 |
| 10,516,771 | B2* | 12/2019 | Kwak | H04L 69/324 |
| 10,681,522 | B1* | 6/2020 | Shintani | G08B 25/14 |
| 10,687,121 | B2* | 6/2020 | Yang | H04N 21/43615 |
| 2001/0013125 | A1* | 8/2001 | Kitsukawa | H04N 21/4784 725/87 |
| 2002/0059590 | A1* | 5/2002 | Kitsukawa | H04N 21/4882 725/36 |
| 2007/0126875 | A1* | 6/2007 | Miyamaki | G08B 13/19667 348/E7.086 |
| 2008/0031285 | A1* | 2/2008 | Kim | H04H 60/39 348/E5.005 |
| 2011/0037590 | A1* | 2/2011 | Kannan | H04W 76/50 370/252 |
| 2011/0199207 | A1* | 8/2011 | Ikeda | H04L 1/0045 340/540 |
| 2016/0087736 | A1* | 3/2016 | Murakami | H04H 60/42 370/312 |
| 2016/0094895 | A1* | 3/2016 | Stadelmeier | H04N 21/814 725/33 |
| 2016/0119919 | A1* | 4/2016 | Mouhouche | H04L 69/22 370/329 |
| 2016/0192033 | A1* | 6/2016 | Kitahara | H04N 21/435 725/33 |
| 2016/0192034 | A1* | 6/2016 | Yamane | H04N 21/237 725/33 |
| 2016/0211931 | A1* | 7/2016 | Takahashi | H04N 21/814 |
| 2016/0248828 | A1* | 8/2016 | Kitahara | H04H 20/93 |
| 2016/0286279 | A1* | 9/2016 | Yang | H04N 21/41265 |
| 2016/0373221 | A1* | 12/2016 | Michael | H04L 5/0053 |
| 2017/0163938 | A1* | 6/2017 | Yajima | G08G 1/16 |
| 2017/0201337 | A1* | 7/2017 | Michael | H04H 20/59 |
| 2017/0223769 | A1* | 8/2017 | Takahashi | H04J 3/0697 |
| 2017/0250767 | A1* | 8/2017 | Deshpande | H04H 20/93 |
| 2017/0264922 | A1* | 9/2017 | Hopkins | H04N 21/84 |
| 2018/0014070 | A1* | 1/2018 | Shintani | H04N 21/4524 |
| 2018/0014171 | A1* | 1/2018 | Walker | H04W 76/50 |
| 2018/0048941 | A1* | 2/2018 | Kitazato | H04W 4/021 |
| 2018/0062777 | A1* | 3/2018 | Yamane | H04W 4/90 |
| 2018/0242052 | A1* | 8/2018 | Ng | H04N 21/4345 |
| 2018/0359520 | A1* | 12/2018 | Takahashi | H04N 21/4385 |
| 2019/0124413 | A1* | 4/2019 | Ng | H04N 21/2362 |
| 2019/0158895 | A1* | 5/2019 | Kwak | H04N 21/2381 |
| 2019/0166390 | A1* | 5/2019 | Kwak | H04L 69/08 |
| 2019/0174204 | A1* | 6/2019 | Deshpande | H04N 21/23614 |
| 2019/0215115 | A1* | 7/2019 | Atungsiri | H04L 5/0053 |
| 2019/0215116 | A1* | 7/2019 | Atungsiri | H04J 11/00 |
| 2019/0222331 | A1* | 7/2019 | Takahashi | H04H 60/13 |
| 2019/0238245 | A1* | 8/2019 | Takahashi | H04N 21/4882 |
| 2019/0289370 | A1* | 9/2019 | Deshpande | H04N 21/435 |
| 2019/0327008 | A1* | 10/2019 | Stephansen | H04N 21/60 |
| 2021/0036793 | A1* | 2/2021 | Okada | H04H 20/59 |

FOREIGN PATENT DOCUMENTS

| | | | | |
|---|---|---|---|---|
| CN | 106993221 | A * | 7/2017 | H04H 20/93 |
| CN | 109787700 | A * | 5/2019 | H04H 20/93 |
| EP | 3058673 | A1 * | 8/2016 | H04H 20/93 |
| JP | 2012-080475 | A | 4/2012 | |
| JP | 2015-046868 | A | 3/2015 | |
| WO | 2014/199633 | A1 | 12/2014 | |
| WO | WO-2015056401 | A1 * | 4/2015 | G06F 21/554 |
| WO | WO-2015107924 | A1 * | 7/2015 | H04H 20/59 |
| WO | WO-2016006472 | A1 * | 1/2016 | H04H 20/59 |
| WO | WO-2017164595 | A1 * | 9/2017 | H04L 65/4076 |
| WO | WO-2017204546 | A1 * | 11/2017 | H04L 67/02 |
| WO | 2018/021072 | A1 | 2/2018 | |
| WO | WO-2018088223 | A1 * | 5/2018 | H04B 1/16 |
| WO | WO-2018088225 | A1 * | 5/2018 | H04B 1/16 |
| WO | WO-2019150841 | A1 * | 8/2019 | H04B 1/16 |

OTHER PUBLICATIONS

"ATSC Proposed Standard: Signaling, Delivery, Synchronization, and Error Protection", Advanced Television System Committee, Document: S33-331r1, Nov. 7, 2017, 206 pages.

"ATSC Standard: System Discovery and Signaling", Advanced Television System Committee, Document: A/321:2016, Mar. 23, 2016, 28 pages.

International Search Report and Written Opinion of PCT Application No. PCT/JP2018/047235, dated Mar. 26, 2019, 07 pages of ISRWO.

* cited by examiner

DEMODULATION CIRCUIT, PROCESSING CIRCUIT, PROCESSING METHOD, AND PROCESSING DEVICE

CROSS REFERENCE TO RELATED APPLICATIONS

This application is a U.S. National Phase of International Patent Application No. PCT/JP2018/047235 filed on Dec. 21, 2018, which claims priority benefit of Japanese Patent Application No. JP2018-018148 filed in the Japan Patent Office on Feb. 5, 2018. Each of the above-referenced applications is hereby incorporated herein by reference in its entirety.

TECHNICAL FIELD

The present disclosure relates to a demodulation circuit, a processing circuit, a processing method, and a processing device.

BACKGROUND ART

Technologies for transmitting alert information using a broadcast signal have been developed. Examples of the above technologies include standardized technologies described in Non-Patent Documents 1 and 2 below.

CITATION LIST

Non-Patent Document

Non-Patent Document 1: "ATSC Standard: A/321, System Discovery and Signaling", Advanced Television Systems Committee, 23 Mar. 2016, Internet (https://www.atsc.org/wp-content/uploads/2016/03)/A321-2016-System-Discovery-and-Signaling.pdf)
Non-Patent Document 2: "ATSC Proposed Standard: Signaling, Delivery, Synchronization, and Error Protection (A/331)", Advanced Television Systems Committee, 23 Mar. 2016, Internet (https://www.atsc.org/wp-content/uploads/2016/01/A331S33-331r1-Signaling-Delivery-Sync-FEC.pdf)

SUMMARY OF THE INVENTION

Problems to be Solved by the Invention

In a case where alert information is transmitted using a broadcast signal, a device (or system) that processes the received broadcast signal is required to acquire the alert information and issue an alert as soon as possible.

The present disclosure proposes new and improved demodulation circuit, processing circuit, processing method, and processing device that are capable of implementing more prompt acquisition of alert information.

Solutions to Problems

According to the present disclosure, there is provided a demodulation circuit including: a demodulation unit configured to demodulate a broadcast signal received by a reception circuit that receives the broadcast signal; a determination unit configured to determine whether or not acquisition of alert information included in the demodulated broadcast signal is necessary according to a set operation mode, on the basis of first alert notification information indicating an update state of the alert information included in the demodulated broadcast signal; and an output processing unit configured to output second alert notification information corresponding to the operation mode from a predetermined terminal to which a processing circuit having a function to acquire the alert information is electrically connected, in a case where acquisition of the alert information is determined to be necessary.

Furthermore, according to the present disclosure, there is provided a processing circuit including a processing unit configured to acquire, in a case where alert notification information output from a demodulation circuit that demodulates a broadcast signal is acquired via a predetermined terminal to which the demodulation circuit is electrically connected, alert information included in the demodulated broadcast signal.

Furthermore, according to the present disclosure, there is provided a processing method executed by a demodulation circuit, the processing method including: a step of demodulating a broadcast signal received by a reception circuit that receives the broadcast signal, a step of determining whether or not acquisition of alert information included in the demodulated broadcast signal is necessary according to a set operation mode, on the basis of first alert notification information indicating an update state of the alert information included in the demodulated broadcast signal; and a step of outputting second alert notification information corresponding to the operation mode from a predetermined terminal to which a processing circuit having a function to acquire the alert information is electrically connected, in a case where acquisition of the alert information is determined to be necessary.

Furthermore, according to the present disclosure, there is provided a processing method executed by a processing circuit, the processing method including a step of acquiring, in a case where alert notification information output from a demodulation circuit that demodulates a broadcast signal is acquired via a predetermined terminal to which the demodulation circuit is electrically connected, alert information included in the demodulated broadcast signal.

Furthermore, according to the present disclosure, there is provided a processing device including a demodulation circuit, and a processing circuit electrically connected to the demodulation circuit, the demodulation circuit including a demodulation unit configured to demodulate a broadcast signal received by a reception circuit that receives the broadcast signal, a determination unit configured to determine whether or not acquisition of alert information included in the demodulated broadcast signal is necessary according to a set operation mode, on the basis of first alert notification information indicating an update state of the alert information included in the demodulated broadcast signal, and an output processing unit configured to output second alert notification information corresponding to the operation mode from a predetermined terminal to which the processing circuit is electrically connected in a case where acquisition of the alert information is determined to be necessary, and the processing circuit including a processing unit configured to acquire, in a case where the second alert notification information is acquired via a predetermined terminal to which the demodulation circuit is electrically connected, the alert information included in the demodulated broadcast signal.

Effects of the Invention

According to the present disclosure, more prompt acquisition of alert information can be implemented.

Note that the above-described effect is not necessarily limited, and any of effects described herein or other effects that can be grasped from descriptions herein may be exhibited in addition to or in place of the above-described effect.

MODE FOR CARRYING OUT THE INVENTION

Figure 1:
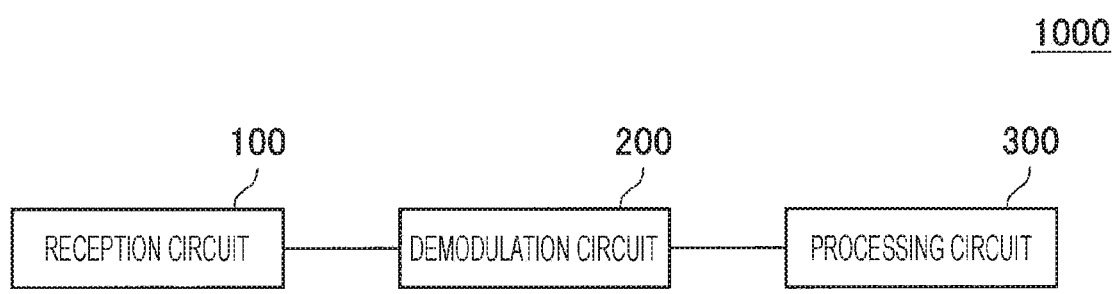
FIG. 1 is an explanatory diagram illustrating an example of a configuration of a processing device according to the present embodiment.

Preferred embodiments of the present disclosure will be described in detail with reference to the appended drawings. Note that, in the descriptions and drawings herein, redundant description of configuration elements having substantially the same functional configuration is omitted by providing the same reference sign.

Furthermore, hereinafter, description will be given in the following order.

1. Processing Device According to Present Embodiment and Processing Method According to Present Embodiment

[1] Configuration of Processing Device According to Present Embodiment

[2] Example of Effects Exhibited in Processing Device According to Present Embodiment

[3] Example of Application of Processing Device According to Present Embodiment

2. Program According to Present Embodiment

Processing Device According to Present Embodiment and Processing Method According to Present Embodiment A processing device according to the present embodiment is a device capable of processing a received broadcast signal.

For example, in a case where the Advanced Television Systems Committee (ATSC) 3.0 standard described in Non-Patent Document 1 or 2 is used, alert information can be transmitted using a broadcast signal. Examples of the alert information according to the present embodiment include a table (or database) in which alert content is recorded, such as an advanced emergency alert table (AEAT) defined in the ATSC 3.0 standard. Note that the alert information according to the present embodiment is not limited to the above-described example and may be data in any format capable of recording alert content.

Furthermore, in the ATSC 3.0 standard, a mechanism called emergency alert system (EAS) for transmitting an update status of the alert information using a broadcast signal is defined. Specifically, in the ATSC 3.0 standard, the update status of the alert information is transmitted by two-bit data of {ea_wake_up_2, ea_wake_up_1}. The above-described two-bit data in the ATSC 3.0 standard corresponds to data indicating the update state of the alert information. Hereinafter, data indicating the update state of the alert information transmitted using a broadcast signal, such as the above-described two-bit data in the ATSC 3.0 standard, is referred to as "first alert notification information".

Hereinafter, a configuration of the processing device according to the present embodiment and a processing method according to the present embodiment will be described mainly using, as an example, a case where the processing device according to the present embodiment processes a broadcast signal conforming to the ATSC 3.0 standard. Note that the processing method according to the present embodiment to be described below is not limited to being applied to the ATSC 3.0 standard and may be applied to any standard in which alert information and first alert notification information are transmitted using a broadcast signal. Furthermore, the processing method according to the present embodiment to be described below can be applied to processing of any broadcast signal capable of transmitting the alert information and the first alert notification information regardless of standardization.

[1] Configuration of Processing Device According to Present Embodiment

FIG. 1 is an explanatory diagram illustrating an example of a configuration of a processing device 1000 according to the present embodiment. The processing device 1000 includes, for example, a reception circuit 100, a demodulation circuit 200, and a processing circuit 300. "The reception circuit 100 and the demodulation circuit 200" and "the demodulation circuit 200 and the processing circuit 300" are electrically connected by one or more wires, and various signals (analog signals or digital signals) are transmitted between the circuits.

The reception circuit 100 receives a broadcast signal.

The demodulation circuit 200 demodulates the broadcast signal received by the reception circuit 100.

Furthermore, the demodulation circuit 200 determines whether acquisition of the alert information is necessary on the basis of the first alert notification information included in the demodulated broadcast signal. Then, in the case where acquisition of the alert information is necessary, the demodulation circuit 200 outputs second alert notification information (to be described below) from a predetermined terminal to which the processing circuit 300 is electrically connected. The second alert notification information (to be described below) according to the present embodiment corresponds to data for notifying that acquisition of the alert information is necessary. Here, the predetermined terminal to which the above-described processing circuit 300 is electrically connected is "a terminal (which may also be referred to as a "pin") capable of outputting a signal of the demodulation circuit 200 electrically connected with the processing circuit 300 and is a terminal from which the second alert notification information (to be described below) is output". Examples of the predetermined terminal to which the processing circuit 300 is electrically connected include a general-purpose input/output (GPIO) of the demodulation circuit 200.

The processing circuit 300 processes the demodulated broadcast signal. Examples of the processing for the demodulated broadcast signal include any processing that can be performed for the demodulated broadcast signal, such as display control processing for displaying an image on a display screen of a display device and sound output processing for outputting sound from a sound output device.

Furthermore, in the case where the second alert notification information is acquired via a predetermined terminal to which the demodulation circuit 200 is electrically connected, the processing circuit 300 acquires the alert information included in the demodulated broadcast signal. Here, the above-described predetermined terminal to which the demodulation circuit 200 is electrically connected is "a terminal (also sometimes called "pin") capable of inputting a signal of the processing circuit 300 electrically connected with the demodulation circuit 200 and is a terminal to which the second alert notification information (to be described below) is input". An example of the above-described predetermined terminal to which the above-described demodulation circuit 200 is electrically connected includes a GPIO included in the processing circuit 300.

The processing device 1000 demodulates the received broadcast signal and processes the demodulated broadcast signal by having the configuration illustrated in FIG. 1, for example.

Furthermore, the processing device 1000 acquires the alert information transmitted using the broadcast signal by having the configuration illustrated in FIG. 1, for example. Here, in the processing device 1000, the demodulation circuit 200 outputs the second alert notification information (to be described below) from the predetermined terminal, and the processing circuit 300 acquires the alert information according to the second alert notification information (to be described below) input from the predetermined terminal. Therefore, necessity of acquisition of the alert information is promptly transmitted between the demodulation circuit 200 and the processing circuit 300, and the processing circuit 300 can more promptly acquire the alert information.

Therefore, the processing device 1000 including the demodulation circuit 200 and the processing circuit 300 implements more prompt acquisition of the alert information.

Note that the configuration of the processing device according to the present embodiment is not limited to the example illustrated in FIG. 1.

For example, in a case where the processing device according to the present embodiment is electrically connected with an external reception circuit having similar function and configuration to the reception circuit 100, for example, the processing device may not include the reception circuit 100 illustrated in FIG. 1.

Furthermore, for example, the demodulation circuit 200 illustrated in FIG. 1 may include part or all of the configuration of the reception circuit 100. An example of the configuration of the demodulation circuit 200 having some of the configuration of the reception circuit 100 includes "a configuration in which the demodulation circuit 200 is connected with an external antenna (an example of part of the configuration of the reception circuit 100)". The above-described demodulation circuit 200 connected with the external antenna processes the broadcast signal received by the antenna.

Furthermore, the processing device according to the present embodiment may include, for example, some or all of a processor (not illustrated), a read only memory (ROM) (not illustrated), a random access memory (RAM) (not illustrated), a recording medium (not illustrated), a display device (not illustrated), a sound output device (not illustrated), an operation device (not illustrated), and a communication device (not illustrated). Furthermore, the processing device according to the present embodiment can have a configuration according to an application example of the processing device according to the present embodiment to be described below.

The processor (not illustrated) is configured by an arithmetic circuit such as a micro processing unit (MPU), for example, and has a function to control the entire processing device according to the present embodiment, for example. Note that, in the processing device 1000 illustrated in FIG. 1, the processing circuit 300 may serve as the processor (not illustrated), for example.

The ROM (not illustrated) stores control data such as a program and operation parameters used by the processor (not illustrated). The RAM (not illustrated) temporarily stores a program executed by the processor (not illustrated) and the like.

The recording medium (not illustrated) is a storage means included in the processing device according to the present embodiment, and stores, for example, various data such as data regarding a processing method in the demodulation circuit 200, data regarding a processing method in the processing circuit 300, and various applications. Here, examples of the recording medium (not illustrated) include a nonvolatile memory such as a flash memory. Note that, in the processing device 1000 illustrated in FIG. 1, one or both of the demodulation circuit 200 and the processing circuit 300 may include the recording medium (not illustrated), for example. Furthermore, the processing device according to the present embodiment may not include the recording medium (not illustrated), and the various data such as data regarding the processing method according to the present embodiment may be stored in an external recording medium of the processing device according to the present embodiment.

The display device (not illustrated) displays various images such as an image illustrating the content of the alert information and an image regarding a user interface (UI) on a display screen. Examples of the display device (not illustrated) include a liquid crystal display, an organic EL display, and the like. Furthermore, for example, the display device may be a device capable of display and operation, such as a touch panel.

The sound output device (not illustrated) outputs various sounds such as a sound (including music) indicating the content of the alert information, and a sound (including music) indicated by the broadcast signal. Examples of the sound output device (not illustrated) include a speaker.

The operation device (not illustrated) is a device that can be operated by a user of the processing device according to the present embodiment. Examples of the operation device (not illustrated) include a button, a directional key, a rotary selector such as a jog dial, and a combination thereof.

The communication device (not illustrated) is a communication means provided in the processing device according to the present embodiment and serves a role of performing communication with an external device by wireless or wired means. Examples of the communication device (not illustrated) include a communication antenna and a radio frequency (RF) circuit (wireless communication), an IEEE 802.15.1 port and a transmission/reception circuit (wireless communication), an IEEE 802.11 port and a transmission/reception circuit (wireless communication), and a local area network (LAN) terminal and a transmission/reception circuit (wired communication).

Hereinafter, an example of the configuration of the processing device according to the present embodiment and processing in each circuit configuring the processing device according to the present embodiment (processing regarding the processing method according to the present embodiment) will be described using, as an example, the processing device 1000 illustrated in FIG. 1.

Furthermore, hereinafter, a case where the broadcast signal is a signal conforming to the ATSC 3.0 standard will be described as an example. Note that, as described above, it goes without saying that the broadcast signal that can be processed by the processing device according to the present embodiment is not limited to the broadcast signal conforming to the ATSC 3.0 standard.

[1-1] Reception Circuit 100

The reception circuit 100 is a circuit (or a circuit group) having a function to receive the broadcast signal.

As an example, the reception circuit 100 includes, for example, an antenna (not illustrated), a first filter (not illustrated), an amplifier (not illustrated), a mixer (not illustrated), and a second filter (not illustrated).

The antenna (not illustrated) is configured by, for example, an antenna having an arbitrary configuration such as a dipole antenna, a monopole antenna, a chip antenna, or a pattern antenna, and receives a radio wave on which the broadcast signal is carried. The first filter (not illustrated) is configured by, for example, an arbitrary filter such as a low-pass filter or a band-pass filter, and removes unnecessary frequency components from the signal received by the antenna (not illustrated). The amplifier (not illustrated) is configured by an arbitrary amplifier such as a low noise amplifier (LNA), and amplifies the signal transmitted from the first filter (not illustrated). To the mixer (not illustrated), the signal transmitted from the amplifier (not illustrated) and a signal of a predetermined frequency generated by an oscillator (not illustrated) or the like are input. The mixer (not illustrated) converts the signal transmitted from the amplifier (not illustrated) into an intermediate frequency (IF) signal. The second filter (not illustrated) is configured by, for example, an arbitrary filter such as a band-pass filter or a low-pass filter, and removes unnecessary frequency components from the IF signal. The signal output through the second filter (not illustrated) corresponds to the broadcast signal (modulated signal modulated by a predetermined method) received from the reception circuit 100.

Note that the configuration of the reception circuit 100 is not limited to the above-described example. The reception circuit 100 can have any configuration capable of receiving the broadcast signal transmitted by radio waves, for example.

[1-2] Demodulation Circuit 200

The demodulation circuit 200 is a circuit (or a circuit group) having a function to demodulate the broadcast signal received by the reception circuit 100.

Furthermore, the demodulation circuit 200 has "a function to determine whether acquisition of the alert information is necessary on the basis of the first alert notification information included in the demodulated broadcast signal and transmit the necessity of acquisition of the alert information to the processing circuit 300" (a function to perform processing regarding the processing method in the demodulation circuit 200).

Note that the functions of the demodulation circuit 200 are not limited to the above-described example.

As described above, the demodulation circuit 200 may have part or all of the configuration of the reception circuit 100. That is, in the processing device according to the present embodiment, the demodulation circuit 200 illustrated in FIG. 1 can further has some or all of the functions of the reception circuit 100 illustrated in FIG. 1. In the case where the demodulation circuit 200 further has some or all of the functions of the reception circuit 100, part or all of the configuration of the reception circuit 100 included in the demodulation circuit 200 serves as a reception unit in the demodulation circuit 200.

Examples of the demodulation circuit 200 include an "integrated circuit (IC) chip which includes one processor or two or more processors and in which various circuits for implementing the functions of the demodulation circuit 200 are integrated". Note that it goes without saying that the demodulation circuit 200 does not have to be implemented in the form of an IC chip.

Hereinafter, the functions of the demodulation circuit 200 will be described. Hereinafter, the function to perform processing regarding the processing method in the demodulation circuit 200, of the functions of the demodulation circuit 200, will be mainly described.

Figure 2:
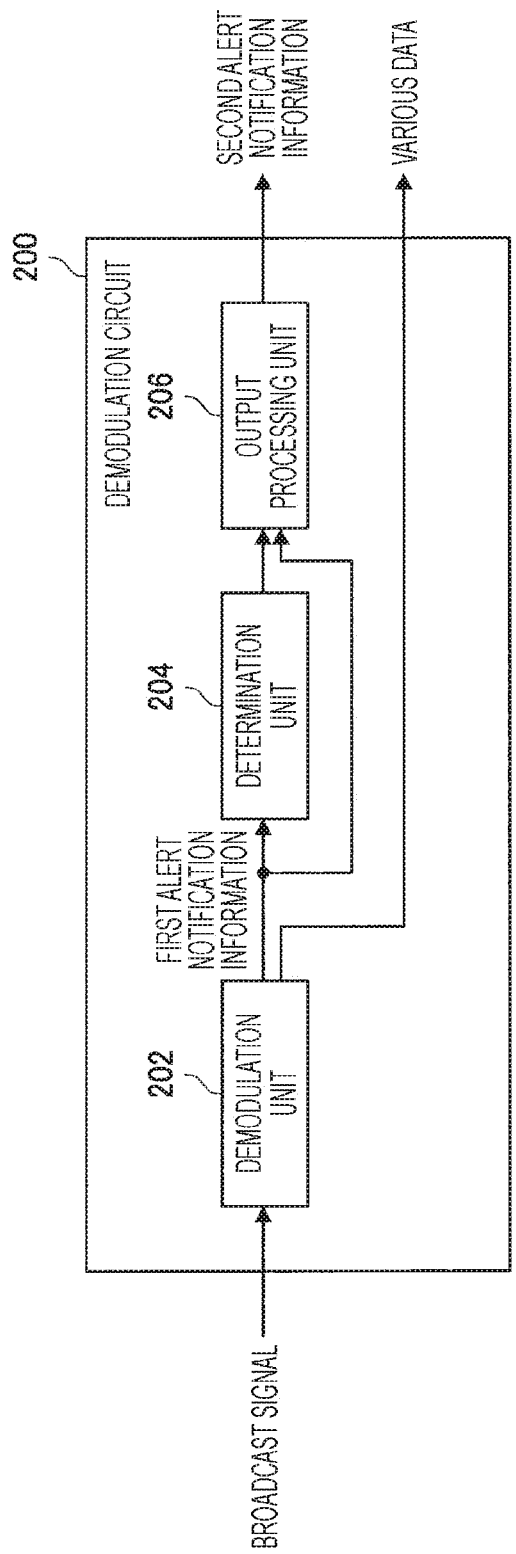
FIG. 2 is a functional block diagram illustrating an example of a configuration of a demodulation circuit provided in the processing device according to the present embodiment.

FIG. 2 is a functional block diagram illustrating an example of a configuration of the demodulation circuit 200 provided in the processing device 1000 according to the present embodiment. The demodulation circuit 200 includes, for example, a demodulation unit 202, a determination unit 204, and an output processing unit 206. Note that, in the functional blocks of the demodulation circuit 200 illustrated in FIG. 2, the functions of the demodulation circuit 200 are divided merely for convenience, and the functional block diagram of the demodulation circuit 200 is not limited to the example illustrated in FIG. 2.

[1-2-1] Demodulation Unit 202

The demodulation unit 202 demodulates the broadcast signal received by the reception circuit 100. The demodulation unit 202 demodulates the broadcast signal by a demodulation method corresponding to a modulation method of the broadcast signal.

The demodulation unit 202 acquires the first alert notification information from the demodulated broadcast signal. As an example, in the ATSC 3.0 standard, an area called BootStrap includes two-bit data of {ea_wake_up_2, ea_wake_up_1}. The demodulation unit 202 acquires the first alert notification information by extracting the above-described two-bit data.

Then, the demodulation unit 202 transmits the acquired first alert notification information to the determination unit 204 and the output processing unit 206, for example. Note that, in a case where a second operation mode or a third operation mode to be described below is set for the demodulation circuit 200, the demodulation unit 202 does not need to transmit the acquired first alert notification information to the output processing unit 206.

The demodulation unit 202 outputs, for example, other data (corresponding to "various data" illustrated in FIG. 2) included in the demodulated broadcast signal, such as image data, sound data, and electric program guide (EPG) data from a terminal to which the processing circuit 300 is electrically connected (a terminal different from the predetermined terminal from which the second alert notification information is output).

Furthermore, in a case where the alert information is included in the demodulated broadcast signal, the demodulation unit 202 may output the alert information from the above-described terminal to which the above-described processing circuit 300 is electrically connected.

[1-2-2] Determination Unit 204

The determination unit 204 determines whether or not acquisition of the alert information included in the demodulated broadcast signal is necessary on the basis of the first alert notification information. Then, the determination unit 204 transmits a determination result to the output processing unit 206.

The determination unit 204 specifies a set operation mode by referring to data indicating operation modes, for example. Then, the determination unit 204 determines whether or not acquisition of the alert information is necessary according to the operation mode set for the demodulation circuit 200. The data indicating operation modes is stored in the recording medium (not illustrated) included in the demodulation circuit 200 or the recording medium (not illustrated) included in the processing device 1000.

The setting of the operation mode for the demodulation circuit 200 is performed at specific timing such as at the time of manufacturing or shipping the processing device 1000, for example. Furthermore, the operation mode set for the demodulation circuit 200 may be changeable by an operation for the operation device by the user of the processing device 1000 or by communication via the communication device, for example.

Examples of the operation mode according to the present embodiment include a first operation mode, a second operation mode, and a third operation mode described below, for example.

First operation mode: an operation mode for outputting the first alert notification information as the second alert notification information Second operation mode: one operation mode for outputting the second alert notification information having a smaller data amount than the first alert notification information Third operation mode: another operation mode for outputting the second alert notification information having a smaller data amount than the first alert notification information In the case where the first operation mode is set, the first alert notification information itself is output from the demodulation circuit 200 to the processing circuit 300. Furthermore, in the case where the second operation mode or the third operation mode is set, the second alert notification information having a smaller data amount than the first alert notification information, that is, data different from the first alert notification information is output from the demodulation circuit 200 to the processing circuit 300. Therefore, in the demodulation circuit 200 for which the second operation mode or the third operation mode can be set, at least most recently acquired first alert notification information is stored in the recording medium (not illustrated) included in the demodulation circuit 200 or the recording medium (not illustrated) included in the processing device 1000, for example.

As will be described below, the area of the above-described recording medium (not illustrated), where at least most recently acquired first alert notification information is stored, may be referred to by the processing circuit 300. The processing circuit 300 specifies the content of the first alert notification information by referring to the first alert notification information stored in the area of the above-described recording medium (not illustrated). That is, in the processing device 1000, the area of the above-described recording medium (not illustrated) corresponds to a "monitor" for the demodulation circuit 200 monitoring the first alert notification information in order for the processing circuit 300 to specify the content of the first alert notification information, for example.

(A) Processing of the Determination Unit 204 in the Case Where the First Operation Mode is Set In a case where the value of the first alert notification information is updated and a combination of a pre-update value and a post-update value of the first alert notification information is a predetermined combination, the determination unit 204 determines that acquisition of the alert information is necessary. Data indicating the above predetermined combination is stored in the recording medium (not illustrated) included in the demodulation circuit 200 or the recording medium (not illustrated) included in the processing device 1000, for example.

In the case where the first alert notification information is the two-bit data of {ea_wake_up_2, ea_wake_up_1} defined in the ATSC 3.0 standard, the two-bit data has the following meaning. In the following, a value of the two-bit data is represented by Verilog-HDL syntax.

{2'b00}: No alert

{2'b01}, {2'b10}, {2'b11}: Alert

Furthermore, in the case where the first alert notification information is the two-bit data of {ea_wake_up_2, ea_wake_up_1} defined in the ATSC 3.0 standard, the value of the two-bit data is repeatedly updated in the order of "{2'b01}→{2'b10}→{2'b11}" every time the content of the alert information is updated. Then, in a case where the alert is gone, the value of the two-bit data is updated to {2'b00}.

In a case where the first alert notification information is two-bit data defined in the ATSC 3.0 standard, for example, the determination unit 204 determines that acquisition of the alert information is necessary "when the value of the two-bit data is updated and the combination of the pre-update value and the post-update value of the two-bit data is one of the following combinations". Note that it goes without saying that the determination by the determination unit 204 in the case where the first alert notification information is the two-bit data is not limited to the following examples.

(Pre-update value)→(Post-update value): {2'b00}→{2'b01}

(Pre-update value)→(Post-update value): {2'b01}→{2'b10}

(Pre-update value)→(Post-update value): {2'b10}→{2'b11}

(Pre-update value)→(Post-update value): {2'b11}→{2'b01}

(B) Processing of the Determination Unit 204 in the Case Where the Second Operation Mode is Set The determination unit 204 determines that acquisition of the alert information is necessary in a case where the first alert notification information indicates a predetermined value. Data indicating the above predetermined value is stored in the recording medium (not illustrated) included in the demodulation circuit 200 or the recording medium (not illustrated) included in the processing device 1000, for example.

In the case where the first alert notification information is two-bit data defined in the ATSC 3.0 standard, for example, the determination unit 204 determines that acquisition of the alert information is necessary "when the value of the two-bit data is any one of {2'b01}, {2'b10}, or {2'b11}". The determination unit 204 determines whether or not acquisition of the alert information is necessary according to whether or not a result of OR operation for all the bits of the two-bit data is "1", for example. In the above-described determination example, data indicating "1" that is to be compared with the result of OR operation corresponds to the data indicating the above predetermined value.

Note that the determination by the determination unit 204 in the case where the first alert notification information is two-bit data is not limited to the above-described example.

For example, the determination unit 204 may determine that acquisition of the alert information is necessary "in the case where the data of the two-bit data is updated and the combination of the pre-update value and the post-update value of the two-bit data is the predetermined combination". The above-described predetermined combination of the pre-update value and the post-update value of the two-bit data corresponds to a series determined that acquisition of the alert information is necessary. Data indicating the above predetermined combination is stored in the recording medium (not illustrated) included in the demodulation circuit 200 or the recording medium (not illustrated) included in the processing device 1000, for example.

(C) Processing of the Determination Unit 204 in the Case Where the Third Operation Mode is Set The determination unit 204 determines that acquisition of the alert information is necessary in a case where a predetermined change in the value of the first alert notification information is detected. Data indicating the above predetermined change is stored in the recording medium (not illustrated) included in the demodulation circuit 200 or the recording medium (not illustrated) included in the processing device 1000, for example.

In the case where the first alert notification information is two-bit data defined in the ATSC 3.0 standard, for example, the determination unit 204 determines that acquisition of the alert information is necessary, as will be described in the following first to fourth examples.

(C-1) First Example of Determination

The determination unit 204 determines that acquisition of the alert information is necessary every time the value of the two-bit data is updated.

(C-2) Second Example of Determination

The determination unit 204 does not determine that acquisition of the alert information is necessary in the case where the combination of the pre-update value and the post-update value of the two-bit data is the predetermined combination, in addition to determination similar to the above first example.

As an example, the determination unit 204 does not determine that acquisition of the alert information is necessary "when the data of the two-bit data is updated and the combination of the pre-update value and the post-update value of the two-bit data is the following combination". Note that it goes without saying that the example of not determining that acquisition of the alert information is necessary is not limited to the following examples.

(Pre-update value)→(Post-update value): {2'b01}→{2'b00}
(Pre-update value)→(Post-update value): {2'b10}→{2'b00}
(Pre-update value)→(Post-update value): {2'b11}→{2'b00}
(Pre-update value)→(Post-update value): {2'b00}→{2'b01}

(C-3) Third Example of Determination

The determination unit 204 determines that acquisition of the alert information is necessary "in a case where the value of the two-bit data is updated and the post-update value is a predetermined value".

The determination unit 204 determines that acquisition of the alert information is necessary "when the value of the two-bit data is any one of {2'b01}, {2'b10}, or {2'b11}". The determination unit 204 determines whether or not acquisition of the alert information is necessary according to whether or not the two-bit data itself corresponds to any of {2'b01}, {2'b10}, {2'b11}, for example. In the above-described determination example, data indicating {2'b01}, {2'b10}, {2'b11} to be compared with the two-bit data corresponds to the data indicating the above-described predetermined change.

(C-4) Fourth Example of Determination

The determination unit 204 determines that acquisition of the alert information is necessary "in the case where the combination of the pre-update value and the post-update value of the two-bit data is the predetermined combination". The above-described predetermined combination of the pre-update value and the post-update value of the two-bit data corresponds to a series determined that acquisition of the alert information is necessary. Data indicating the predetermined combination corresponds to the data indicating the above-described predetermined change.

The determination unit 204 determines whether or not acquisition of the alert information is necessary according to the operation mode set for the demodulation circuit 200, as illustrated in (A) to (C) above, for example, and transmits a determination result to the output processing unit 206. Note that it goes without saying that the example of determination according to the set operation mode is not limited to the above-described examples.

[1-2-3] Output Processing Unit 206

The output processing unit 206 outputs the second alert notification information from the predetermined terminal to which the processing circuit 300 is electrically connected on the basis of the determination result transmitted from the determination unit 204.

The second alert notification information according to the present embodiment is data indicating the update state of the alert information output from the demodulation circuit 200 to the processing circuit 300.

The output processing unit 206 specifies the set operation mode by referring to data indicating operation modes, for example. Then, the output processing unit 206 outputs the second alert notification information corresponding to the operation mode set for the demodulation circuit 200.

As an example, in the case where the first operation mode is set, the output processing unit 206 outputs the first alert notification information as the second alert notification information. As a specific example, in the case where the first alert notification information is the two-bit data of {ea_wake_up_2, ea_wake_up_1} defined in the ATSC 3.0 standard, the output processing unit 206 outputs the two-bit data from the predetermined terminal to which the processing circuit 300 is electrically connected.

As another example, in the case where the second operation mode or the third operation mode is set, the output processing unit 206 outputs the second alert notification information having a smaller data amount than the first alert notification information. As a specific example, in the case where the first alert notification information is the two-bit data of {ea_wake_up_2, ea_wake_up_1} defined in the ATSC 3.0 standard, the output processing unit 206 outputs one-bit data indicating a predetermined value as the second alert notification information. Examples of the one-bit data output by the output processing unit 206 include a flag indicating whether or not the alert information has been updated (or a flag indicating whether or not acquisition of the alert information is necessary), for example.

As illustrated in the above-described example, the output processing unit 206 outputs the first alert notification information as the second alert notification information or outputs predetermined data having a smaller data amount than the first alert notification information as the second alert notification information, according to the set operation mode. That is, the second alert notification information can change according to the set operation mode.

Note that the example of the second alert notification information is not limited to the above-described examples, and may be data in any format capable of transmitting that the alert information has been updated from the demodulation circuit 200 to the processing circuit 300.

(a) Processing of the Output Processing Unit 206 in the Case Where the First Operation Mode is Set The output processing unit 206 outputs the first alert notification information transmitted from the demodulation unit 202 as the second alert notification information.

As an example, in the case where the first alert notification information is two-bit data defined by the ATSC 3.0 standard, the output processing unit 206 outputs two-bit data as the second alert notification information.

(b) Processing of the Output Processing Unit 206 in the Case Where the Second Operation Mode is Set The output processing unit 206 outputs predetermined data having a smaller data amount than the first alert notification information as the second alert notification information.

As an example, in the case where the first alert notification information is the two-bit data defined by the ATSC 3.0 standard, the output processing unit 206 outputs one-bit data indicating a predetermined value as the second alert notification information. The predetermined value indicated by the one-bit data is, for example, "1". Note that, in the case where the result of OR operation is transmitted together with the determination result from the determination unit 204, the output processing unit 206 may use a value indicated by the result of OR operation as the predetermined value.

(c) Processing of the Output Processing Unit 206 in the Case Where the Third Operation Mode is Set The output processing unit 206 outputs predetermined data having a smaller data amount than the first alert notification information as the second alert notification information.

As an example, in the case where the first alert notification information is the two-bit data defined by the ATSC 3.0 standard, the output processing unit 206 outputs one-bit data indicating a predetermined value as the second alert notification information. The predetermined value indicated by the one-bit data is, for example, "1".

As illustrated in the first example illustrated in above (C-1) to the fourth example illustrated in above (C-4), in the case where the third operation mode is set, the determination unit 204 can determine whether or not acquisition of the alert information is necessary by the various determination methods.

Therefore, in the case where the determination result transmitted from the determination unit 204 indicates that acquisition of the alert information is necessary, the output processing unit 206 holds the predetermined value such as "1" by a sample-and-hold circuit or the like. Then, the output processing unit 206 outputs the stored one-bit data indicating a predetermined value as the second alert notification information. The predetermined value held by the sample-and-hold circuit or the like is initialized to an initial value such as "0" in response to acquisition of the alert information in the processing circuit 300 to be described below. The demodulation circuit 200 (for example, the output processing unit 206) initializes the value held in the sample-and-hold circuit or the like on the basis of a signal indicating that acquisition of the alert information has been performed output from the processing circuit 300. The above-described signal indicating that acquisition of the alert information has been performed corresponds to an example of a control signal for controlling the demodulation circuit 200 by the processing circuit 300.

The output processing unit 206 outputs the second alert notification information corresponding to the operation mode set for the demodulation circuit 200 from the predetermined terminal to which the processing circuit 300 is electrically connected, as illustrated in above (a) to (c), for example.

The output processing unit 206 outputs data (digital signal) of a bit depth smaller than a bit depth defined in the ATSC 3.0 standard as the second alert notification information, as described in the example in (b) or the example in (c) above, the effect of "reducing the numbers of terminals (numbers of pins) of the demodulation circuit 200 and the processing circuit 300 as compared with a case of simply designing a device according to the standard" is exhibited.

Figure 3:
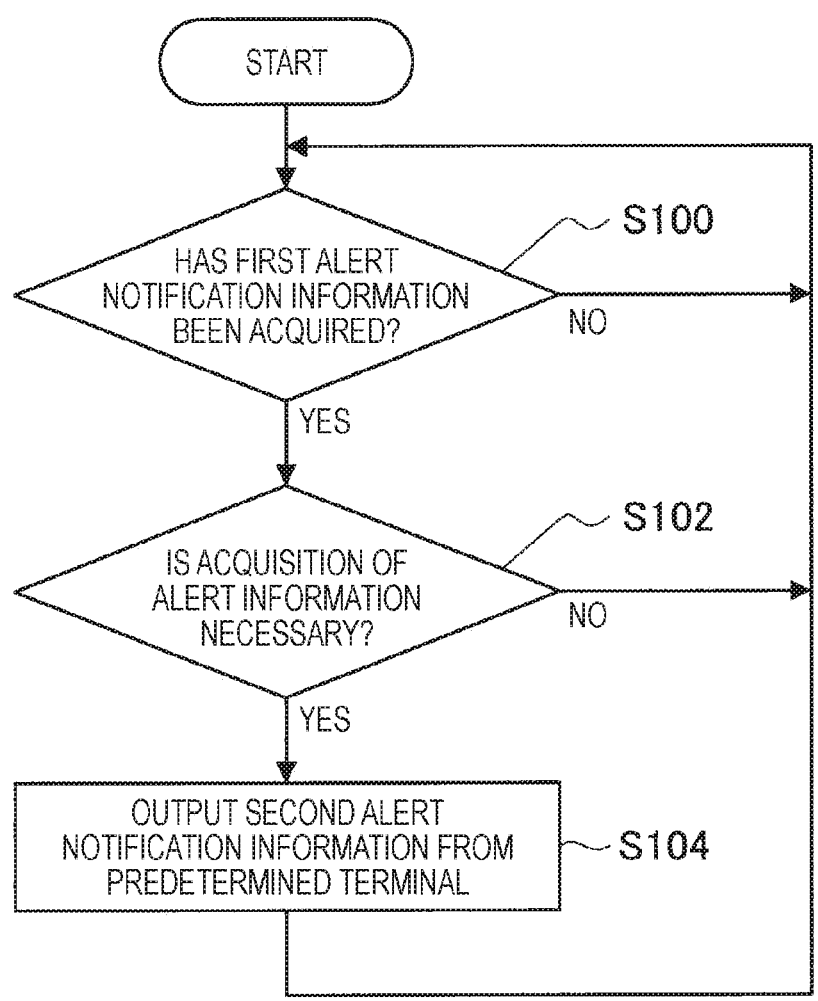
FIG. 3 is a flowchart illustrating an example of processing regarding a processing method in the demodulation circuit provided in the processing device according to the present embodiment.

FIG. 3 is a flowchart illustrating an example of the processing regarding the processing method in the demodulation circuit 200 provided in the processing device 1000 according to the present embodiment. The processing in steps S100 and S102 in FIG. 3 corresponds to an example of the processing in the determination unit 204, and the processing in step S104 corresponds to an example of the processing in the output processing unit 206.

The demodulation circuit 200 determines whether or not the first alert notification information has been acquired (S100). Taking the broadcast signal conforming to the ATSC 3.0 standard as an example, the demodulation circuit 200 determines that the first alert notification information has been acquired in the case where the two-bit data of {ea_wake_up_2, ea_wake_up_1} is acquired from the area called BootStrap of the demodulated broadcast signal.

In the case where it is determined that the first alert notification information has been acquired in step S100, the demodulation circuit 200 does not proceed until acquisition of the first alert notification information is determined.

Furthermore, in the case where it is determined that the first alert notification information has been acquired in step S100, the demodulation circuit 200 determines whether or not acquisition of the alert information is necessary on the basis of the first alert notification information (S102). The demodulation circuit 200 determines whether or not acquisition of the alert information is necessary according to the operation mode set for the demodulation circuit 200, as illustrated in (A) to (C) above, for example.

In the case where it is not determined that acquisition of the alert information is necessary in step S102, the demodulation circuit 200 repeats the processing from step S100.

Furthermore, in the case where it is determined that acquisition of the alert information is necessary in step S102, the demodulation circuit 200 outputs the second alert notification information from the predetermined terminal to which the processing circuit 300 is electrically connected (S104). The output processing unit 206 outputs the second alert notification information corresponding to the operation mode set for the demodulation circuit 200 from the predetermined terminal to which the processing circuit 300 is electrically connected, as illustrated in above (a) to (c), for example.

Then, the demodulation circuit 200 repeats the processing from step S100.

The demodulation circuit 200 outputs the second alert notification information corresponding to the operation mode from the predetermined terminal to which the processing circuit 300 is electrically connected by performing the processing illustrated in FIG. 3, for example, as processing regarding the processing method. Note that it goes without saying that the example of the processing in the demodulation circuit 200 is not limited to the example illustrated in FIG. 3.

[1-3] Processing Circuit 300

The processing circuit 300 is a circuit (or a circuit group) having a function to process the demodulated broadcast signal. Examples of the processing for the demodulated broadcast signal include any processing that can be performed for the demodulated broadcast signal, such as display control processing for displaying an image on a display screen of a display device and sound output processing for outputting sound from a sound output device.

Furthermore, in the case where the second alert notification information is acquired via the predetermined terminal to which the demodulation circuit 200 is electrically connected, the processing circuit 300 acquires the alert information included in the demodulated broadcast signal. Taking the broadcast signal conforming to the ATSC 3.0 standard as an example, the processing circuit 300 extracts the AEAT included in low level signaling (LLS) from the demodulated broadcast signal to acquire the alert information.

In the case where the alert information has been acquired, the processing circuit 300 may perform processing of notifying content indicated by the acquired alert information. Examples of the processing of notifying content indicated by the alert information include arbitrary processing capable of notifying content indicated by the alert information such as "display control processing of displaying an image indicated by the content of the alert information on the display screen of the display device (not illustrated)" or "sound output processing of outputting a sound indicating the content of the alert information from the sound output device (not illustrated)".

Note that the processing of the processing circuit 300 in the case where the alert information is acquired is not limited to the above-described example.

For example, the processing device 1000 has various operation states such as a normal operation state in which the various functions of the processing device 1000 are operable, and a standby state where only some of the functions of the processing device 1000 is operable. In the case where the processing device 1000 has the plurality of operation states as described above, the processing circuit 300 may perform the processing of notifying the content indicated by the alert information after changing the operation state in response to acquisition of the alert information.

As an example, in the case where the operation state of the processing device 1000 when the alert information is acquired in the processing circuit 300 is the standby state, the processing circuit 300 transitions the operation state from the standby state to the normal operation state, and notifies the content indicated by the alert information. As described above, by transitioning the operation state from the standby state to the normal operation state in response to acquisition of the alert information in the processing circuit 300, the processing device 1000 can be activated earlier and the content indicated by the alert information can be notified even when the processing device 1000 is in the standby state when an alert is newly issued (when the alert information is updated).

As described above, the demodulation circuit 200 outputs the second alert notification information corresponding to the operation mode set for the demodulation circuit 200. Therefore, the processing circuit 300 may perform processing corresponding to the operation mode set for the demodulation circuit 200, as will be described below. The processing circuit 300 specifies the operation mode set for the demodulation circuit 200 by referring to the data indicating operation modes. The data indicating operation modes is stored in the recording medium (not illustrated) included in the demodulation circuit 200 or in the recording medium (not illustrated) included in the processing device 1000, for example, and the processing circuit 300 refers to the data indicating operation modes stored in the recording medium (not illustrated). Note that the data indicating operation modes may be stored in the recording medium (not illustrated) included in the processing circuit 300, and the processing circuit 300 may refer to the data indicating operation modes stored in the recording medium (not illustrated).

Examples of the processing circuit 300 include an "IC chip which includes one processor or two or more processors and in which various circuits for implementing the functions of the processing circuit 300 are integrated". Note that it goes without saying that the processing circuit 300 does not have to be implemented in the form of an IC chip.

Hereinafter, functions of the processing circuit 300 will be described.

Figure 4:
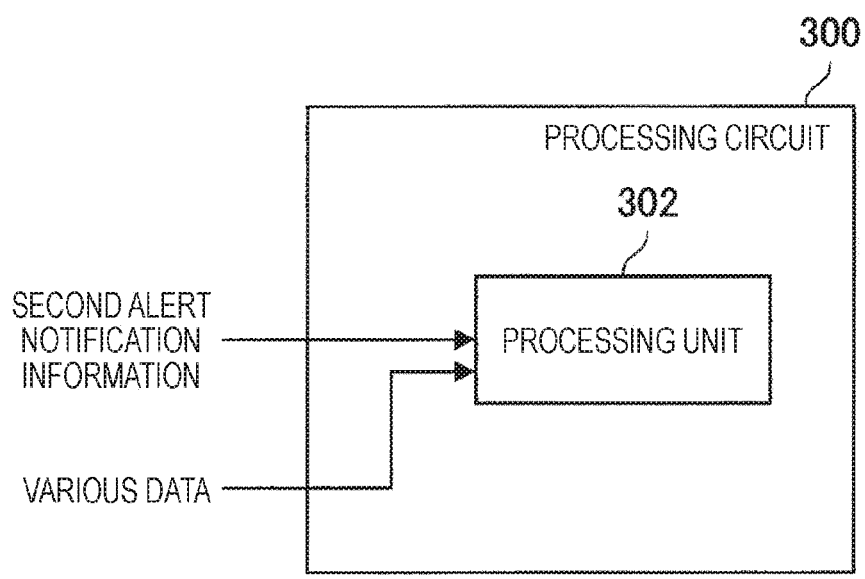
FIG. 4 is a functional block diagram illustrating an example of a configuration of a processing circuit provided in the processing device according to the present embodiment.

FIG. 4 is a functional block diagram illustrating an example of the configuration of the processing circuit 300 provided in the processing device 1000 according to the present embodiment. The processing circuit 300 includes, for example, a processing unit 302. Note that the functional blocks of the processing circuit 300 illustrated in FIG. 4 are obtained by dividing the functions of the processing circuit 300 for convenience, and the functional block diagram of the processing circuit 300 is not limited to the example illustrated in FIG. 4.

The processing unit 302 processes the demodulated broadcast signal. For example, the processing unit 302 performs arbitrary processing that can be performed for the demodulated broadcast signal such as display control processing of displaying an image on the display screen of the display device (not illustrated) and sound output processing of outputting a sound from the sound output device (not illustrated) on the basis of various data (main line data) included in the demodulated broadcast signal such as image data, sound data, and EPG data.

Furthermore, in the case where the second alert notification information is acquired from the demodulation circuit 200, the processing unit 302 acquires the alert information included in the demodulated broadcast signal.

In the case where the broadcast signal is the broadcast signal conforming to the ATSC 3.0 standard, the processing circuit 300 extracts the AEAT included in the LLS from the demodulated broadcast signal to acquire the alert information, for example. More specifically, in the case where the broadcast signal is the broadcast signal conforming to the ATSC 3.0 standard, the processing circuit 300 selects a physical layer pipe (PLP) of "L1D_plp_lls_flag=H", confirms output of the various data (main line data) included in the demodulated broadcast signal from the demodulation circuit 200, and extracts the AEAT included in the LLS.

As described above, the processing circuit 300 can acquire the alert information by the processing corresponding to the operation mode set for the demodulation circuit 200. Hereinafter, an example of the processing corresponding to the set operation mode will be described.

For example, in the case where the first operation mode is set, the second alert notification information output from the processing circuit 300 is the first alert notification information itself included in the broadcast signal. Therefore, the processing unit 302 interprets the content of the second alert notification information output from the processing circuit 300 according to a set interpretation method such as an interpretation method conforming to the ATSC 3.0 standard, and acquires the alert information.

For example, in the case where the second operation mode is set, the processing unit 302 acquires the alert information every time the second alert notification information output from the processing circuit 300 is detected.

In the case where the second operation mode is set when the first alert notification information is the two-bit data defined in the ATSC 3.0 standard, the second alert notification information is "one-bit data indicating a predetermined value corresponding to the result of OR operation for all the bits of the two-bit data", as described above. That is, in the case where the second operation mode is set, the second alert notification information output from the processing circuit 300 is not the first alert notification information itself. Therefore, the processing unit 302 cannot interpret the content of the second alert notification information in a similar manner to the case where the first operation mode is set.

Therefore, the processing unit 302 may interpret the content of the first alert notification information by referring to the "area corresponding to the "monitor" for the demodulation circuit 200 monitoring the first alert notification information" (the area of the recording medium (not illustrated) where at least most recently acquired first alert notification information is stored). Note that, even in a case where the processing unit 302 does not interpret the content of the first alert notification information, the processing unit 302 can acquire the alert information in response to the detection of the second alert notification information.

For example, in the case where the third operation mode is set, the processing unit 302 acquires the alert information every time the second alert notification information output from the processing circuit 300 is detected.

In the case where the third operation mode is set when the first alert notification information is the two-bit data defined in the ATSC 3.0 standard, the second alert notification information is the "one-bit data indicating a predetermined value stored in the sample-and-hold circuit or the like", as described above. That is, in the case where the third operation mode is set, the second alert notification information output from the processing circuit 300 is not the first alert notification information itself.

Therefore, the processing unit 302 may interpret the content of the first alert notification information by referring to the "area corresponding to the "monitor" for the demodulation circuit 200 monitoring the first alert notification information", similarly to the case where the second operation mode is set when the first alert notification information is the two-bit data defined in the ATSC 3.0 standard. Note that, even in the case where the processing unit 302 does not interpret the content of the first alert notification information, the processing unit 302 can acquire the alert information in response to the detection of the second alert notification information.

Furthermore, in the case where the third operation mode is set when the first alert notification information is the two-bit data defined in the ATSC 3.0 standard, the processing unit 302 outputs the signal indicating that acquisition of the alert information has been performed from the terminal to which the demodulation circuit 200 is electrically connected to the demodulation circuit 200 when acquiring the alert information on the basis of the second alert notification information. The terminal from which the above-described signal indicating that acquisition of the alert information has been performed is output may be the predetermined terminal for detecting the second alert notification information or may be a different terminal. When the processing unit 302 outputs the above-described signal indicating that acquisition of the alert information has been performed, the demodulation circuit 200 initializes the value held in the sample-and-hold circuit or the like, as described above.

Note that the processing in the processing unit 302 is not limited to the above-described example.

For example, as described above, the processing unit 302 may further perform processing of notifying the content indicated by the acquired alert information.

Furthermore, as described above, the processing unit 302 may perform processing of notifying the content indicated by the alert information after changing the operation state of the processing device 1000 in response to the acquisition of the alert information, for example.

The processing device 1000 includes the reception circuit 100, the demodulation circuit 200, and the processing circuit 300 having the functions and configurations described with reference to FIGS. 1 to 4, for example. Note that it goes without saying that the configuration of the processing device according to the present embodiment is not limited to the above-described configuration, as described above.

[2] Example of Effects Exhibited in Processing Device According to Present Embodiment By using the processing device according to the present embodiment, the following effects are exhibited for example. Note that it goes without saying that the effect exhibited by using the processing device according to the present embodiment is not limited to the following examples.

The demodulation circuit according to the present embodiment outputs the data (corresponding to the second alert notification information according to the present embodiment) corresponding to the EAS in the ATSC 3.0 standard from the GPIO included in the demodulation circuit to the processing circuit according to the present embodiment. Here, the demodulation circuit according to the present embodiment outputs the above-described data corresponding to the EAS from the GPIO to the processing circuit according to the present embodiment on the basis of the two-bit data of {ea_wake_up_2, ea_wake_up_1} acquired when BootStrap of the broadcast signal is decoded. Therefore, the demodulation circuit according to the present embodiment can output the above-described data corresponding to the EAS to the processing circuit according to the present embodiment if BootStrap of the broadcast signal is decoded, thereby transmitting necessity of acquisition of the alert information to the processing circuit early.

The necessity of acquisition of the alert information is transmitted to the processing circuit according to the present embodiment early, whereby early activation of the processing device according to the present embodiment (early start of the processing device according to the present embodiment) can be implemented even in the case where the processing device according to the present embodiment is in the standby state.

In the case where the second operation mode or the third operation mode is set, the demodulation circuit according to the present embodiment recreates the two-bit data of {ea_wake_up_2, ea_wake_up_1} defined in the ATSC 3.0 standard to one-bit data (digital signal) and outputs the one-bit data. Therefore, in the processing device according to the present embodiment, the numbers of terminals (numbers of pins) of the demodulation circuit according to the present embodiment and the processing circuit according to the present embodiment can be further reduced.

[3] Example of Application of Processing Device According to Present Embodiment

As described above, the processing device has been described as the present embodiment, but the present embodiment is not limited to this embodiment. The processing device can be applied to, as the present embodiment, for example, any device capable of processing an acquired broadcast signal, such as a "TV receiver", a "set top box", a "smartphone", a "computer such as personal computer (PC)", a "tablet-type device", a "game console", or "any mobile body such as car". Furthermore, the processing device according to the present embodiment can be applied to, for example, an IC or a large scale integration (LSI) that can be incorporated in the above-described device.

Program According to Present Embodiment

[I] Program for Functioning as Demodulation Circuit According to Present Embodiment When a program (program capable of implementing the functions of the demodulation unit 202, the determination unit 204, and the output processing unit 206 illustrated in FIG. 2, for example) for causing a computer to function as the demodulation circuit according to the present embodiment is executed by a processor or the like in the computer, the processing device capable of implementing more prompt acquisition of the alert information is implemented.

Furthermore, when the program for causing a computer to function as the demodulation circuit according to the present embodiment is executed by a processor or the like in the computer, the effects exhibited by the processing device according to the present embodiment can be exhibited.

[II] Program for Functioning as Processing Circuit According to Present Embodiment When a program (program capable of implementing the functions of the processing unit 302 illustrated in FIG. 4, for example) for causing a computer to function as the processing circuit according to the present embodiment is executed by a processor or the like in the computer, the various types of processing based on the demodulated broadcast signal and the various types of processing using the alert information included in the broadcast signal are implemented.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

For example, in the above description, provision of the program (computer program) for causing a computer to function as the demodulation circuit according to the present embodiment and the program (computer program) for causing a computer to function as the processing circuit according to the present embodiment has been described. However, the present embodiment can provide recording media in which the programs are respectively stored or a recording medium in which the programs are both stored.

The above-described configurations illustrate an example of the present embodiment, and naturally belongs to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)

A demodulation circuit including:

a demodulation unit configured to demodulate a broadcast signal received by a reception circuit that receives the broadcast signal;

a determination unit configured to determine whether or not acquisition of alert information included in the demodulated broadcast signal is necessary according to a set operation mode, on the basis of first alert notification information indicating an update state of the alert information included in the demodulated broadcast signal; and an output processing unit configured to output second alert notification information corresponding to the operation mode from a predetermined terminal to which a processing circuit having a function to acquire the alert information is electrically connected, in a case where acquisition of the alert information is determined to be necessary.

(2)

The demodulation circuit according to (1), in which the output processing unit outputs the first alert notification information as the second alert notification information or outputs predetermined data having a smaller data amount than the first alert notification information as the second alert notification information, according to the operation mode.

(3)

The demodulation circuit according to (1) or (2), in which, in a case where a first operation mode for outputting the first alert notification information as the second alert notification information is set as the operation mode, the determination unit determines that acquisition of the alert information is necessary in a case where a value of the first alert notification information is updated and a combination of a pre-update value and a post-update value of the first alert notification information is a predetermined combination, and the output processing unit outputs the first alert notification information as the second alert notification information.

(4)

The demodulation circuit according to (3), in which the first alert notification information is two-bit data, the determination unit determines that acquisition of the alert information is necessary in a case where a value of the two-bit data is updated and a combination of a pre-update value and a post-update value of the two-bit data is a predetermined combination, and the output processing unit outputs the two-bit data as the second alert notification information.

(5)

The demodulation circuit according to any one of (1) to (4), in which, in a case where a second operation mode that is one operation mode for outputting the second alert notification information having a smaller data amount than the first alert notification information is set as the operation mode, the determination unit determines that acquisition of the alert information is necessary in a case where the first alert notification information indicates a predetermined value, and the output processing unit outputs predetermined data having a smaller data amount than the first alert notification information as the second alert notification information.

(6)

The demodulation circuit according to (5), in which the first alert notification information is two-bit data, the determination unit performs an OR operation for all of bits of the two-bit data, and determines that acquisition of the alert information is necessary in a case where a result of the OR operation indicates the predetermined value, and the output processing unit outputs one-bit data indicating a predetermined value as the second alert notification information.

(7)

The demodulation circuit according to according to any one of (1) to (6), in which, in a case where a third operation mode that is another operation mode for outputting the second alert notification information having a smaller data amount than the first alert notification information is set as the operation mode, the determination unit determines that acquisition of the alert information is necessary in a case where a predetermined change in a value of the first alert notification information is detected, and the output processing unit outputs predetermined data having a smaller data amount than the first alert notification information as the second alert notification information.

(8)

The demodulation circuit according to (7), in which the first alert notification information is two-bit data, the determination unit determines that acquisition of the alert information is necessary every time a value of the two-bit data is updated, and the output processing unit outputs one-bit data indicating a predetermined value as the second alert notification information.

(9)

The demodulation circuit according to (8), in which the determination unit does not determine that acquisition of the alert information is necessary in a case where a combination of a pre-update value and a post-update value of the two-bit data is a predetermined combination.

(10)

The demodulation circuit according to (7), in which the first alert notification information is two-bit data, the determination unit determines that acquisition of the alert information is necessary in a case where a value of the two-bit data is updated and a post-update value is a predetermined value, and the output processing unit outputs one-bit data indicating a predetermined value as the second alert notification information.

(11)

The demodulation circuit according to (7), in which the first alert notification information is two-bit data, the determination unit determines that acquisition of the alert information is necessary in a case where a combination of a pre-update value and a post-update value of the two-bit data is a predetermined combination, and the output processing unit outputs one-bit data indicating a predetermined value as the second alert notification information.

(12)

The demodulation circuit according to any one of (1) to (11), further including:

a reception unit having part or all of the reception circuit.

(13)

The demodulation circuit according to any one of (1) to (12), in which the first alert notification information is data corresponding to the ATSC 3.0 standard.

(14)

A processing circuit including:

a processing unit configured to acquire, in a case where alert notification information output from a demodulation circuit that demodulates a broadcast signal is acquired via a predetermined terminal to which the demodulation circuit is electrically connected, alert information included in the demodulated broadcast signal.

(15)

The processing circuit according to (14), in which the processing unit causes content indicated by the acquired alert information to be notified.

(16)

A processing method executed by a demodulation circuit, the processing method including:

a step of demodulating a broadcast signal received by a reception circuit that receives the broadcast signal;

a step of determining whether or not acquisition of alert information included in the demodulated broadcast signal is necessary according to a set operation mode, on the basis of first alert notification information indicating an update state of the alert information included in the demodulated broadcast signal; and step of outputting second alert notification information corresponding to the operation mode from a predetermined terminal to which a processing circuit having a function to acquire the alert information is electrically connected, in a case where acquisition of the alert information is determined to be necessary.

(17)

A processing method executed by a processing circuit, the processing method including:

a step of acquiring, in a case where alert notification information output from a demodulation circuit that demodulates a broadcast signal is acquired via a predetermined terminal to which the demodulation circuit is electrically connected, alert information included in the demodulated broadcast signal.

(18)

A processing device including:

a demodulation circuit; and a processing circuit electrically connected to the demodulation circuit, the demodulation circuit including a demodulation unit configured to demodulate a broadcast signal received by a reception circuit that receives the broadcast signal, a determination unit configured to determine whether or not acquisition of alert information included in the demodulated broadcast signal is necessary according to a set operation mode, on the basis of first alert notification information indicating an update state of the alert information included in the demodulated broadcast signal, and an output processing unit configured to output second alert notification information corresponding to the operation mode from a predetermined terminal to which the processing circuit is electrically connected, in a case where acquisition of the alert information is determined to be necessary, and the processing circuit including a processing unit configured to acquire, in a case where the second alert notification information is acquired via a predetermined terminal to which the demodulation circuit is electrically connected, the alert information included in the demodulated broadcast signal.

REFERENCE SIGNS LIST

100 Reception circuit
200 Demodulation circuit
202 Demodulation unit
204 Determination unit
206 Output processing unit
300 Processing circuit
302 Processing unit
1000 Processing device

The invention claimed is:

1. A demodulation circuit, comprising:
a demodulation unit configured to demodulate a broadcast signal received from a reception circuit that receives the broadcast signal;
a determination unit configured to determine acquisition of alert information, included in the demodulated broadcast signal, is necessary based on a set operation mode of the demodulation circuit and first alert notification information,
wherein the first alert notification information indicates an update state of the alert information included in the demodulated broadcast signal; and
an output processing unit configured to output specific data as second alert notification information from a specific terminal, based on the set operation mode and the determination the acquisition of the alert information is necessary, wherein
the specific data has a smaller data amount than the first alert notification information, and
the specific terminal is electrically connected to a processing circuit that acquires the alert information.

2. The demodulation circuit according to claim 1, wherein, in a case where the set operation mode is a first operation mode to output the first alert notification information as the second alert notification information,
the determination unit is further configured to determine the acquisition of the alert information is necessary, based on:
a value of the first alert notification information that is updated, and
a specific combination of a pre-update value and a post-update value of the first alert notification information, and
the output processing unit is further configured to output the first alert notification information as the second alert notification information.

3. The demodulation circuit according to claim 2, wherein the first alert notification information is two-bit data.

4. The demodulation circuit according to claim 1, wherein, in a case where the set operation mode is a second operation mode to output the second alert notification information having the smaller data amount than the first alert notification information,
the determination unit is further configured to determine the acquisition of the alert information is necessary, based on the first alert notification information which indicates a first specific value, and
the output processing unit is further configured to output the specific data having the smaller data amount than the first alert notification information as the second alert notification information.

5. The demodulation circuit according to claim 4, wherein the first alert notification information is two-bit data,
the determination unit is further configured to:
perform an OR operation for all of bits of the two-bit data, and
determine the acquisition of the alert information is necessary based on a result of the OR operation that indicates the first specific value, and
the output processing unit is further configured to output one-bit data indicating a second specific value as the second alert notification information.

6. The demodulation circuit according to claim 1, wherein, in a case where the set operation mode is a third operation mode to output the second alert notification information having the smaller data amount than the first alert notification information,
the determination unit is further configured to determine the acquisition of the alert information is necessary, based on a detection of a specific change in a value of the first alert notification information, and
the output processing unit is further configured to output the specific data, having the smaller data amount than the first alert notification information, as the second alert notification information.

7. The demodulation circuit according to claim 6, wherein the first alert notification information is two-bit data,
the determination unit is further configured to determine that the acquisition of the alert information is necessary every time a value of the two-bit data is updated,
the output processing unit is further configured to output one-bit data indicating a specific value as the second alert notification information, and
the one-bit data is the specific data.

8. The demodulation circuit according to claim 7, wherein the determination unit is further configured to not determine that the acquisition of the alert information is necessary based on a specific combination of a pre-update value and a post-update value of the two-bit data.

9. The demodulation circuit according to claim 6, wherein the first alert notification information is two-bit data,
the determination unit is further configured to determine the acquisition of the alert information is necessary, based on an update in a value of the two-bit data and a post-update value of the two-bit data that is a first specific value,
the output processing unit is further configured to output one-bit data indicating a second specific value as the second alert notification information, and
the one-bit data is the specific data.

10. The demodulation circuit according to claim 6, wherein
the first alert notification information is two-bit data,
the determination unit is further configured to determine the acquisition of the alert information is necessary, based on a specific combination of a pre-update value and a post-update value of the two-bit data,
the output processing unit is further configured to output one-bit data indicating a specific value as the second alert notification information, and
the one-bit data is the specific data.

11. The demodulation circuit according to claim 1, further comprising a reception unit having a part or all of the reception circuit.

12. The demodulation circuit according to claim 1, wherein the first alert notification information is data corresponding to the Advanced Television Systems Committee (ATSC) 3.0 standard.

13. A processing circuit, comprising:
a processing unit configured to:
acquire, in a case where specific data is acquired as second alert notification information via a specific terminal to which a demodulation circuit is electrically connected, alert information included in a demodulated broadcast signal, wherein
the specific terminal is electrically connected to the processing unit,
the specific data is output as the second alert notification information from the demodulation circuit, based on a set operation mode of the demodulation circuit and first alert notification information,
the specific data has a smaller data amount than the first alert notification information,
the demodulation circuit demodulates a broadcast signal to output the demodulated broadcast signal, and
the second alert notification information indicates that the acquisition of the alert information is necessary based on the set operation mode of the demodulation circuit; and
notify content in the acquired alert information.

14. A demodulation processing method, comprising:
demodulating a broadcast signal received from a reception circuit that receives the broadcast signal;
determining acquisition of alert information, included in the demodulated broadcast signal, is necessary based on a set operation mode of a demodulation circuit and first alert notification information,
wherein the first alert notification information indicates an update state of the alert information included in the demodulated broadcast signal; and
outputting specific data as second alert notification information from a specific terminal, based on the set operation mode and the determination the acquisition of the alert information is necessary, wherein
the specific data has a smaller data amount than the first alert notification information, and
the specific terminal is electrically connected to a processing circuit that acquires the alert information.

15. A processing method, comprising:
acquiring, in a case where specific data is acquired as second alert notification information via a specific terminal to which a demodulation circuit is electrically connected, alert information included in a demodulated broadcast signal, wherein
the specific terminal is electrically connected to a processing unit,
the specific data is output as the second alert notification information from the demodulation circuit, based on a set operation mode of the demodulation circuit and first alert notification information,
the specific data has a smaller data amount than the first alert notification information,
the demodulation circuit demodulates a broadcast signal to output the demodulated broadcast signal, and
the second alert notification information indicates that the acquisition of the alert information is necessary based on the set operation mode of the demodulation circuit; and
notifying content in the acquired alert information.

16. A processing device, comprising:
a demodulation circuit; and
a processing circuit electrically connected to the demodulation circuit, wherein
the demodulation circuit includes:
a demodulation unit configured to demodulate a broadcast signal received from a reception circuit that receives the broadcast signal,
a determination unit configured to determine acquisition of alert information, included in the demodulated broadcast signal, is necessary based on a set operation mode of the demodulation circuit and first alert notification information,
wherein the first alert notification information indicates an update state of the alert information included in the demodulated broadcast signal, and
an output processing unit configured to output specific data as second alert notification information from a first terminal, based on the set operation mode and the determination the acquisition of the alert information is necessary,
the specific data has a smaller data amount than the first alert notification information,
the first terminal is electrically connected to the processing circuit, and
the processing circuit includes a processing unit configured to acquire, in a case where the specific data is acquired as the second alert notification information via a second terminal to which the demodulation circuit is electrically connected, the alert information included in the demodulated broadcast signal.

17. A demodulation circuit, comprising:
a demodulation unit configured to demodulate a broadcast signal received from a reception circuit that receives the broadcast signal;
a determination unit configured to determine, in a case where a set operation mode of the demodulation circuit is an operation mode to output first alert notification information as second alert notification information, acquisition of alert information included in the demodulated broadcast signal is necessary based on
a value of the first alert notification information that is updated, and
a specific combination of a pre-update value and a post-update value of the first alert notification information,
wherein the first alert notification information indicates an update state of the alert information included in the demodulated broadcast signal; and
an output processing unit configured to output the first alert notification information as the second alert notification information from a specific terminal based on the set operation mode and the determination the acquisition of the alert information is necessary, wherein the specific terminal is electrically connected to a processing circuit that acquires the alert information.

* * * * *